July 31, 1962 F. P. DOWNING 3,047,214
CENTRIFUGAL PROCESS AND APPARATUS
Filed April 23, 1958 3 Sheets-Sheet 1

INVENTOR.
FRANCIS P. DOWNING
BY Hugo G. Feumnan
ATTORNEY

INVENTOR.
FRANCIS P. DOWNING
BY Hugo G. Fernman
ATTORNEY

July 31, 1962     F. P. DOWNING     3,047,214
CENTRIFUGAL PROCESS AND APPARATUS
Filed April 23, 1958     3 Sheets-Sheet 3

INVENTOR.
FRANCIS P. DOWNING
BY Hugo G. Fernman
ATTORNEY

United States Patent Office 3,047,214
Patented July 31, 1962

3,047,214
CENTRIFUGAL PROCESS AND APPARATUS
Francis P. Downing, Philadelphia, Pa., assignor to The Sharples Corporation, a corporation of Delaware
Filed Apr. 23, 1958, Ser. No. 730,326
8 Claims. (Cl. 233—14)

This invention relates to a process for the purification of liquids, and to apparatus for carrying out the process.

In industry there is an increasing need for the separation of immiscible fluids that become emulsified. This is particularly the case in the separation of various types of oils, such as animal oils, vegetable oils, mineral oils, synthetic oils, etc., from a water phase. It is frequently the case that mixtures of oil and water become badly emulsified due to the presence of emulsifying agents of various types. In order to separate these two immiscible phases, to obtain an oil-free water and a dry oil, it is common to utilize a centrifugal separator. When the mixture of oil and water also contains dense solids, a self-cleaning type centrifuge is generally utilized.

The mixture of water and oil to be separated may have any origin, and may occur naturally, for example, in the case of crude petroleum oil, or any oil which acquires moisture while in storage or during processing without deliberate addition of water, or the mixture may result from the deliberate addition of water to the oil, such as in the case of water washing of vegetable oil, or of tallow, or of petroleum oil. Another source is the mixture of oil, water and various solid impurities known in the petroleum industry as "slop oil."

The effect of centrifugal force on the rupturing and coalescence of emulsions is marked. That is, the greater the centrifugal force that is employed on an emulsion, the greater is the degree of coalescence or compaction of the emulsified material. This is desirable, since the coalescence of the emulsified material is necessary before a complete clean break of the two phases can be obtained.

In a centrifuge bowl, the relative depth of the oil phase and the water phase present in the bowl is governed by a mechanical dam adjustment, and the relative density of the two phases. Ordinarily, in centrifuge operation the mechanical adjustment of the dam size is set before the machine is put in operation. Change of the mechanical adjustment cannot be made without stopping and readjusting the centrifuge. The relative densities of the oil and water is normally controlled by the temperature at which they are fed to the centrifuge. Thus if the mixture of oil and water is fed at 200° F. the density of the water becomes fixed as well as the density of the oil. Therefore, the ratio of the two densities, which in turn governs the relative depths of the oil and water in the centrifuge bowl with a given mechanical dam adjustment, is a fixed condition.

It becomes quite important for a satisfactory separation of an emulsion-containing oil and water stream, that the position of the emulsion layer which normally exists at the interface between the oil and water phases, be placed in the area of highest centrifugal force in the bowl. The movement of this interfacial zone even a fraction of an inch in the centrifuge bowl will substantially affect the results. A movement of the interfacial zone radially outward will produce a drier oil in most cases, and could produce a water discharge containing some oil. A movement of the interfacial zone radially inward will often give an oil having a higher moisture content, but a more oil-free water phase. The placing of the interfacial zone in a position as far out in the bowl as possible will effect, due to the higher centrifugal force available through the greater radii, a larger amount of rupturing or breakage of an emulsion with a substantially improved separation.

While the position of the emulsified area may be adjusted through mechanical changes in the dam size, this often involves very frequent changing of the dams in the bowl requiring that the centrifuge be stopped and disassembled. Changes in the density and composition of the feed cannot be compensated for while the centrifuge is in operation. Changes in temperature of the feed, which will in almost all cases change the density relationship of the two phases, and hence the position of the emulsified layer in the bowl, again cannot be corrected for while the centrifuge is in operation. Frequently the stoppage of the centrifuge and disassemblage and cleaning will take a substantially long period, often four hours or more.

It, therefore, becomes desirable that the accurate positioning of the emulsified layer in the bowl, and the interface between the oil and water phases, be made controllable without stopping the machine.

This invention pertains to the adjustment of the relative depth of the two phases and the position of the emulsified layer in the bowl while the centrifuge is in operation.

In carrying out the invention utilization is made of a flow to the outer portion of the bowl of auxiliary liquid, the density of which is controlled relative to the density of the liquid undergoing treatment in the centrifuge so as to result in an outer layer of a desired higher density. The density of the auxiliary liquid may be either higher or lower than the heavier phase present in the feed mixture, when the heavier phase to be separated is soluble in the auxiliary liquid. In the case of the presence of material to be separated which is insoluble in the auxiliary liquid, the auxiliary liquid should be of equal or lower density than such material. When such material is soluble, the auxiliary liquid having a density either greater or less than that of the heavier phase present in the feed combines with the heavier phase separated from the oil phase to provide a heavy phase layer in the bowl of intermediate density. As will be more clearly seen hereinafter, the density and locus of feed of auxiliary liquid control the position of the interface.

Further features of the invention will become apparent to persons skilled in the art upon becoming familiar with the following particular description which is made in connection with the accompanying drawings, in which FIGURE 1 is a vertical sectional view of a centrifuge bowl;

Since knowledge of the construction of a centrifuge useful in the practice of the invention will be helpful to a clear understanding thereof, such centrifuge will be first described.

Figure 1:
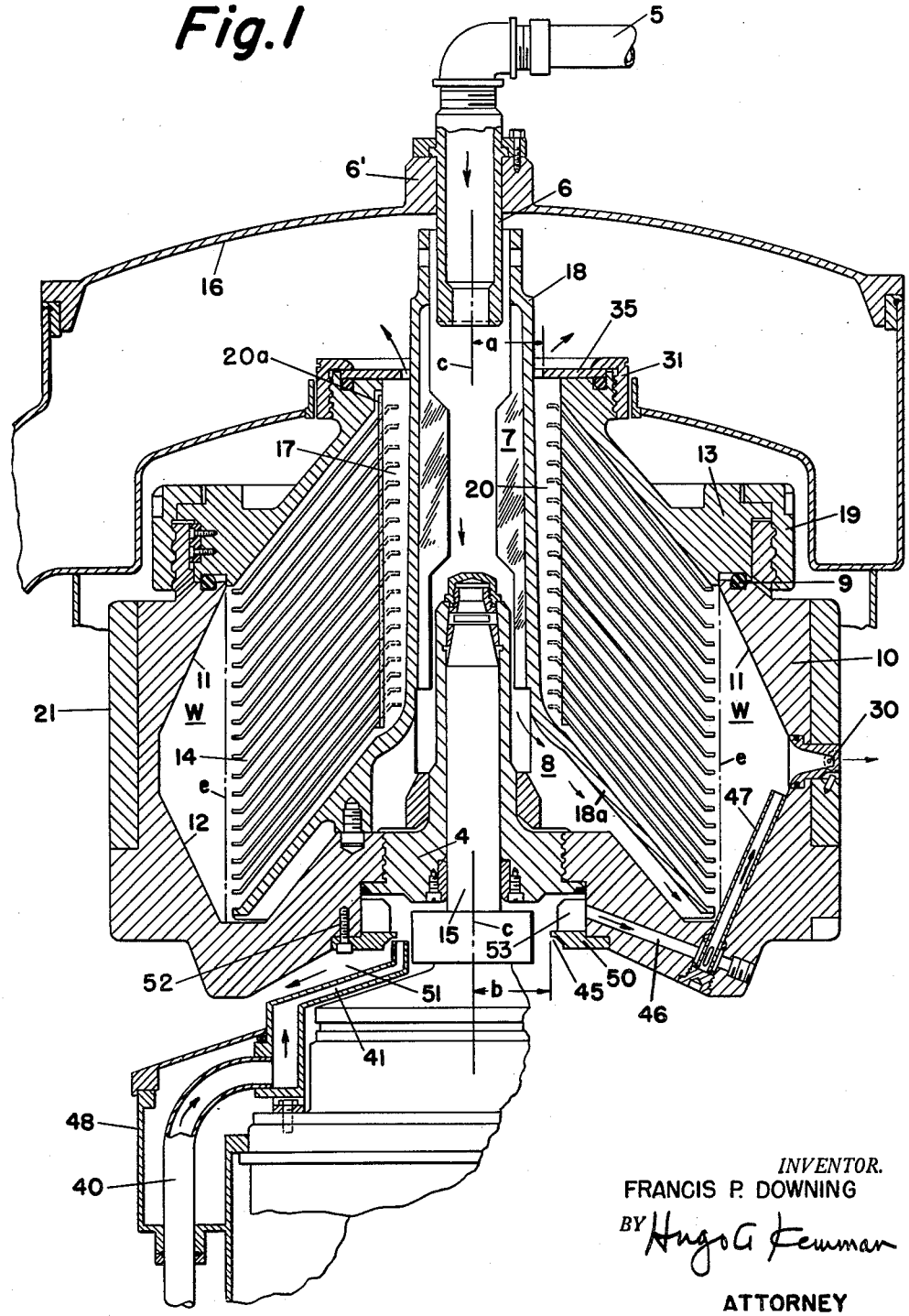

Referring to FIGURE 1, the centrifuge bowl illustrated is of the disc type, and is provided with a number of peripheral nozzles which permit continuous discharge therethrough. At 10 is shown a bowl having a frusto-conical shaped inner periphery defined by inclined walls 11 and 12. Bowl 10 may be provided with an external reinforcing band 21 of a material stronger than that of which the bowl 10 is made. A plurality of circumferentially spaced nozzles 30 communicating with the region W within the bowl 10 are provided at the inner periphery of the bowl 10 at the region of its maximum internal diameter. The nozzles 30 preferably are arranged to discharge tangentially and in the direction opposite to the direction of rotation of the bowl 10. The nozzle discharge is collected in a suitable collection device or enclosure, not shown.

The bowl 10 is provided with a member 4 which has a bore for receiving a drive shaft 15 extending from any suitable drive mechanism, not shown. Bowl 10 is provided with a top 13 which is retained by a coupling ring 19. A gasket ring 9 seals the top 13 of the bowl 10 to prevent escape of liquid.

A stack of stratifying discs 14 of frusto-conical contour is shown retained within the bowl 10 on the bowl center tube 18 which is provided at its lower end with a skirt or flaring portion 18a suitably secured within the bowl 10. The center tube 18 is provided with a plurality of radial wings 20, and the discs of disc stack 14 are notched to fit over wings 20. One of the wings 20 is provided with an extending fin 20a which fits into a corresponding notch in each disc of disc stack 14 to provide for orientation of the discs.

The feed, e.g. moisture-containing oil, or a mixture of oil and water, which may or may not contain solids, enters bowl 10 through a stationary conduit 5 which is connected to a feed nozzle 6 extending downwardly into bowl center tube 18. Feed nozzle 6 is retained by a flange 6' shown integral with stationary cover 16. A plurality of vanes 7 are provided within the center tube 18, and serve to accelerate the feed as it enters the bowl. A plurality of additional radially positioned vanes 8 are provided within skirt 18a, and serve to further accelerate the feed and direct it to the outer periphery of the stratifying disc stack 14. The feed then flows upwardly about the outer periphery of disc stack 14 and inwardly toward the axis of rotation between the discs of disc stack 14, during which oil immiscible liquid and/or solids are separated from the oil and, upon such separation, flow outwardly from the axis of rotation. The inwardly flowing oil enters the central spaces 17 between wings 20, and then flows upwardly and discharges from the bowl over the ring dam 35. A large part of the material separated from the oil by the centrifugal force, moves radially outwardly from the discs, passes through the interface between the oil layer and the auxiliary liquid layer, which is indicated by dot and dash line "e," enters the auxiliary liquid layer which occupies the space W, and eventually is discharged from bowl 10 through nozzles 30 along with auxiliary liquid.

The emulsion, on the other hand, until it is broken by the centrifugal force, acts as if it were a phase of intermediate density, and collects at the interface between the oil and auxiliary liquid layers. Since the rate at which and the degree to which the emulsion is broken up into its constituents is a function of the centrifugal force applied thereto, the importance of being able to control said centrifugal force during operation, through control of the radial position of the interface, becomes self-evident.

A ring dam 50 is provided at the bottom of the bowl 10, and is shown secured thereto by means of bolts 52. Ring dam 50 has an inner circular opening 45 having a radius, or in other words a radial distance from the axis of rotation, indicated by the letter "b." Attached to the upper surface of ring dam 50 are a plurality of radially positioned vanes 53 which serve to pick up and accelerate auxiliary liquid, e.g. water, fed into the bowl through opening 45 by means of a feed nozzle 41. Feed nozzle 41 is connected to a supply conduit 40 for continuously feeding auxiliary liquid to the nozzle 41. A cover 48 is provided about the conduit 40 and adjacent mechanism over which any excess auxiliary liquid flows to a suitable receptacle not shown.

A plurality of circumferentially spaced bores 46 are provided in the bowl 10, each bore being connected to a tube 47 extending within the interior of the bowl and terminating adjacent the region of an associated nozzle 30. Bores 46 and tubes 47 serve to conduct auxiliary liquid projected upwardly through nozzle 41 and outwardly by vanes 53 to the nozzles 30. The effluent ejected through nozzles 30 may be conducted to a suitable receiver in which, if desired, any sludge or solids may be permitted to settle, and auxiliary liquid as well as any oil thus separated may be recirculated through the bowl via conduit 40, if dseired. On the other hand, any oil present may be skimmed off the auxiliary liquid prior to the recycling of auxiliary liquid through the bowl via conduit 40. It will, of course, be understood that auxiliary liquid may be obtained from any desired source, and need not be recycled for reuse, even though the latter has its economic aspects.

Bowl 10 will accept auxiliary liquid from nozzle 41 at a rate which is not greater than the rate of discharge of auxiliary liquid through the nozzles 30. Bowl 10 will reject at the opening 45 of ring dam 50 whatever excess auxiliary liquid that may be supplied by the nozzle 41, such excess auxiliary liquid flowing downwardly over the exterior of cover 48. A constant radial level of auxiliary liquid is thus maintained. Theoretically speaking, the maximum rate at which bowl 10 will accept auxiliary liquid from nozzle 41 is equal to the rate of total discharge through nozzles 30 minus the rate at which non-oil materials, including water, are separated from the oil in the bowl, since the latter materials also are discharged from bowl 10 through nozzles 30. It is customary to provide each discharge nozzle with an interchangeable bushing, the discharge channel being within the bushing. By providing bushings having discharge channels of a variety of diameters from which to select, the rate of discharge through the nozzles may be varied over a wide range at will.

Figure 3:
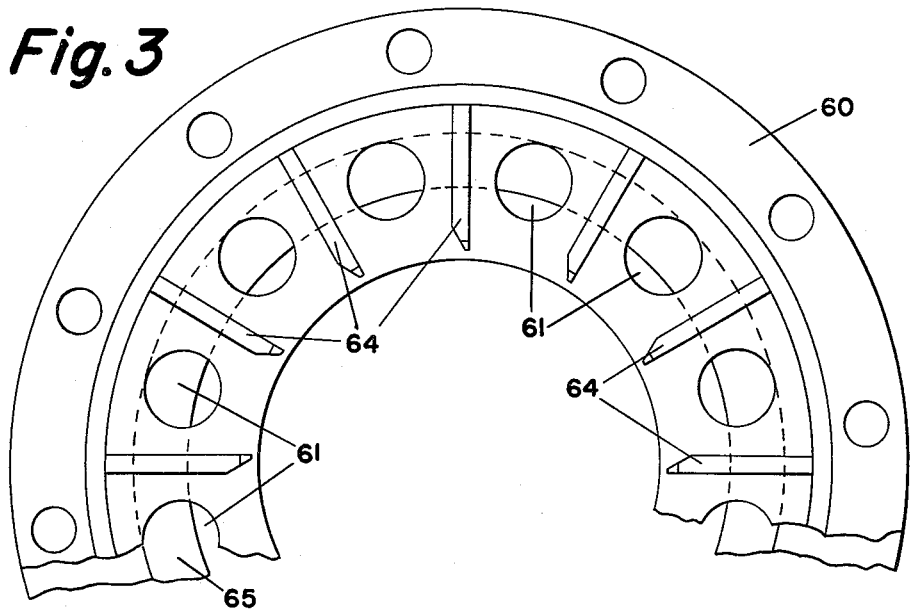
FIGURE 3 is an enlarged fragmental plan view of a portion of the water inlet and overflow dam construction of FIGURE 2.
Figure 2:
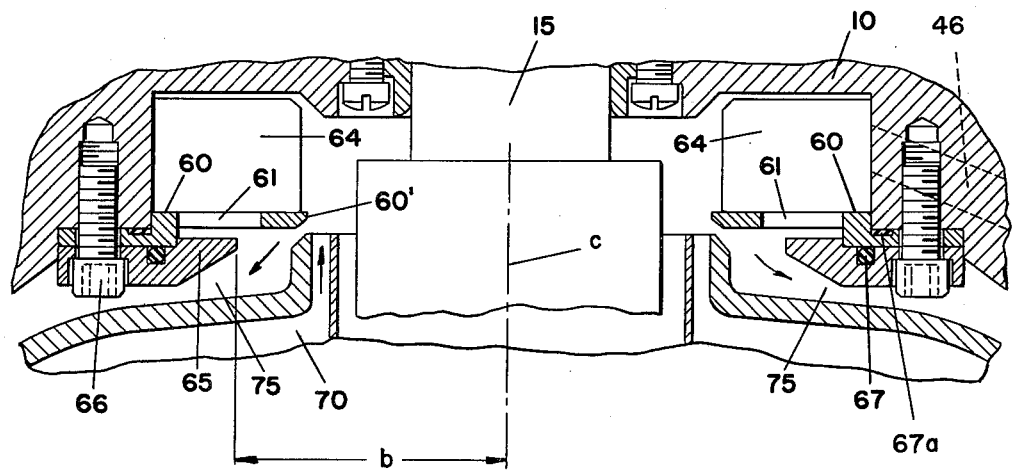
FIGURE 2 is a fragmental enlarged vertical sectional view of a modified water inlet and overflow dam construction.

Another type of lower ring dam structure is illustrated in FIGURES 2 and 3 of the drawings wherein ring dam 65 is shown secured to the bottom of the bowl 10 by means of bolts 66. A collector ring 60 is shown secured between ring dam 65 and bowl 10, and sealing gaskets 67 and 67A make liquid tight seals between the dam 65, ring 60 and bowl 10. Collector ring 60 is provided with a plurality of openings 61, and with a plurality of radially positioned vanes 64 secured thereto between said openings 61.

In this modification, water supplied through nozzle 70 passes up around inner edge 60' of collector ring 60, and is picked up by vanes 64 and delivered to bores 46, vanes 64 functioning in the same manner as vanes 53 in FIGURE 1. Water which is not accepted by the bowl flows downwardly through openings 61 and over ring dam 65 and out through channel 75. Ring dam 65 is interchangeable the same as ring dam 50 of FIGURE 1, and for the same purpose as above described in connection with ring dam 50. Any other suitable structure may be substituted.

The radial position of the circumferential interface "e" between the layers of oil and auxiliary liquid in the bowl is governed (1) by the relative densities of the oil layer and the auxiliary liquid layer, and (2) by the relative radial positions of he inner edges of ring dams 35 and 50 with respect to each other. Since in the practice of the invention, the latter relationship is determined by choice before the bowl is put into operation, considerations influencing such choice will now be described.

The inner edge of ring dam 35 has a radial distance "a" from the axis of rotation, the latter being indicated at "c," and this distance customarily is fixed so as to maintain a layer of oil within the inner edges of the discs of disc stack 14 sufficient for unrestricted flow upwardly to the dam 35 of oil from all discs including the lowermost disc. The inner edge of ring dam 50 has a radial distance "$b$" from the axis of rotation, and this distance is subject to relatively wide variation within a range less than diameter "$a$" by having available interchangeable ring dams having openings 45 of a variety of diameters. The same applies to the ring dam 65 of FIGURES 2 and 3.

Thus in choosing the initial radial position of the circumferential interface "$e$" from the axis of rotation, it is customary to consider the radial distance "$a$" as fixed and the radial distance "$b$" as variable. By the term "initial radial position" is meant the position the circumferential interface "$e$" would have if the relative densities of the oil layer and the auxiliary liquid layer were fixed.

It will be understood that radius "$a$" of ring dam 35 may be adjusted along with radius "$b$" of ring dam 50, to position circumferential interface "$e$" at the desired initial radial distance from hte axis of rotation, for ring dam 35 may be made interchangeable the same as ring dam 50. It will also be understood that it is conceivable, depending upon the design and construction of bowl 10, that the desired positioning of circumferential interface "$e$" may be accomplished solely by selecting a ring dam 35 having an appropriate radius "$a$."

Now assuming that the radial position of the inner edge of ring dam 35 is fixed, such as for the reasons above described, a ring dam 50 is selected affording a radius "$b$" such that the circumferential interface "$e$" occupies a chosen initial radial position, which is frequently, though not necessarily outward from the outer periphery of disc stack 14, but radially inward from the discharge ends of tubes 47, for it is the final radial position of the "$e$" line, adjusted if necessary in accordance with the invention, that is the determining factor in the separation, and not its initial radial position as defined herein.

With all other factors remaining constant, an appropriate initial position for the "$e$" line may be, of course, be arrived at merely by trying various ring dams of different inner radii until a desired initial position for the "$e$" line is obtained, in which case a comparison of the separating results obtained in the practice of the invention may be used as a guide. A skilled centrifugal engineer, on the other hand, will resort to simple calculations of which the following is illustrative.

Let us assume that a residual fuel oil is to be centrifuged at 195° F., at which temperature it has a specific gravity of say 0.936, and that available water at the same temperature has a specific gravity of say 0.965. Also let us assume that the disc stack in the centrifuge bowl has an outside diameter of 11 inches, making its outside radius from the axis of rotation 5.5 inches. Also let us assume that a 6 inch radius is initially chosen for the position of the "$e$" line. The latter radius will be designated $r_e$. Also let us assume that the inside diameter of the disc stack is 4.25 inches, making its inside radius 2.125 inches. Then to allow for the free flow of clarified oil upwardly inside of the inner edges of the discs, let us assume that a ring dam 35 is chosen which is 0.5 inch smaller in inner diameter than the inner diameter of the discs, which makes the radius "$a$" 1.875 inches.

The inner radius "$b$" of the ring dam 50 is now arrived at by the use of the formula:

$$\frac{\text{specific gravity of water}}{\text{specific gravity of oil}} = \frac{r_e^2 - a^2}{r_e^2 - b^2}$$

substituting in this formula we obtain, $$\frac{0.965}{0.936} = \frac{36 - 3.515}{36 - b^2}$$

solving for "$b$," we obtain, $$b = 2.10 \text{ inches}$$

If a 7 inch radius had been initially chosen for the position of the "$e$" line, the result would have been as follows:

$$\frac{0.965}{0.936} = \frac{49 - 3.515}{49 - b^2}$$

solving for "$b$," we obtain $$b = 2.18 \text{ inches}$$

From the above calculations, it will be seen that with all other factors remaining constant, the circumferential interface "$e$" moves radially outwardly with increase in the difference between dimensions "$a$" and "$b$" (i.e. as "$b$" minus "$a$" increases), and vice versa.

It has been convenient in such calculations to consider the auxiliary liquid as being of the same temperature as the oil, for under such circumstances the temperature of the feed of auxiliary liquid into the bowl, and its temperature in the bowl when intermixed with water separated from the oil, are the same, thus affording a simplification in calculations.

It will, of course, be understood by persons skilled in the art that since the initial radial position of the "$e$" line is, for practicable purposes, a theoretical position in the practice of the invention, the density of the auxiliary liquid in the bowl, in making the above calculations, may be taken as of a different temperature from that of the oil. Also since such initial radial position is a theoretical position, it need not fall within the inner confines of the bowl, but actually may be positioned outside thereof. This is because in the practice of the invention, the "$e$" line moves radially inwardly with increase in the density of the auxiliary liquid in the bowl, and vice versa, and its position is therefore determined through the control in density of the auxiliary liquid.

An outstanding feature of the invention is that the radial position of the "$e$" line during operation is highly sensitive to change in density of the auxiliary liquid in the bowl, as can be readily seen by substituting a different figure for the specific gravity of water in the above formula, whereas the density of the oil flowing through the bowl is relatively insensitive to change in temperature of the auxiliary liquid in the bowl, even through the latter is brought to a substantially different temperature from that of the oil. The reason for the latter is not entirely clear, but is believed to be due to the fact that the great bulk of the oil flow through the bowl does not come into contact with the auxiliary liquid at the interface, and the time of contact of that small portion which does is so short, due to the continuous flow of oil, as not to materially change its temperature.

Various means are available for changing the density of the auxiliary liquid in the bowl such as change in temperature and/or the use of an additive soluble in the auxiliary liquid. For example, when the auxiliary liquid is water, its density may be increased by dissolving therein a salt of higher density, such as a sodium salt, e.g. sodium sulfate, or a magnesium salt, e.g. magnesium sulfate. To decrease the density of the auxiliary liquid, when water, a water soluble liquid of density lower than that of water may be added, such as an alcohol, of which the methyl, ethyl, propyl, butyl and amyl alcohols and their isomers are examples. While the oils have a certain solubility in the alcohols, this is greatly reduced by the presence of water, and in view of the very short time of the limited contact between oil and auxiliary liquid, the amount of oil dissolved in the auxiliary liquid is extremely small. In any event there is a limit to any such solubility, and by reuse of the auxiliary liquid discharged from the bowl by recycling it to the bowl, any loss of oil through solution in the auxiliary liquid is prevented.

In the practice of the invention the "$e$" line is moved radially inwardly by increasing the density of the auxiliary liquid, and is moved radially outwardly by decreasing the density of the auxiliary liquid. By maintaining the density of the auxiliary liquid constant, the radial position of the "e" line remains fixed at its chosen position.

When employing a disc stack which is fed at its outer edges, such as the disc stack illustrated in the drawings, it is customary to position the interface between the oil and auxiliary liquid at least a short distance radially outward from the disc stack, in order to afford unrestricted flow of the feed upwardly about the periphery of the disc stack, so that the feed may freely enter the spaces between all of the discs. The radial position of the interface, on the other hand, should not overlap the ends of tubes 47, for in such case the oil would discharge from the bowl backwardly through tubes 47 and bores 46, and over ring dam 50, instead of over ring dam 35 as intended, dimension "b" being greater than dimension "a." Such result is called "loss of seal."

To correct for loss of seal, the density of the auxiliary liquid is increased to move the interface between the oil and the auxiliary liquid radially inwardly, and to increase the centrifugal force on the emulsion collecting at the interface, the density of the auxiliary liquid is decreased to move the interface radially outwardly, but not to such an extent as to result in loss of seal. The exact position of the interface or "e" line is thus brought within the positive control of the operator during the operation of the centrifuge through his positive control of the density of the auxiliary liquid in the bowl.

The invention may be applied to a wide variety of separations wherein the position of the interface or "e" line is a factor influencing the efficiency of separation, including processes in which separations are effected, and of which the following is given by way of illustration, and not of limitation, to show how the invention may be applied to the water washing of an oil, and/or to the separation of water from oil.

Figure 4:
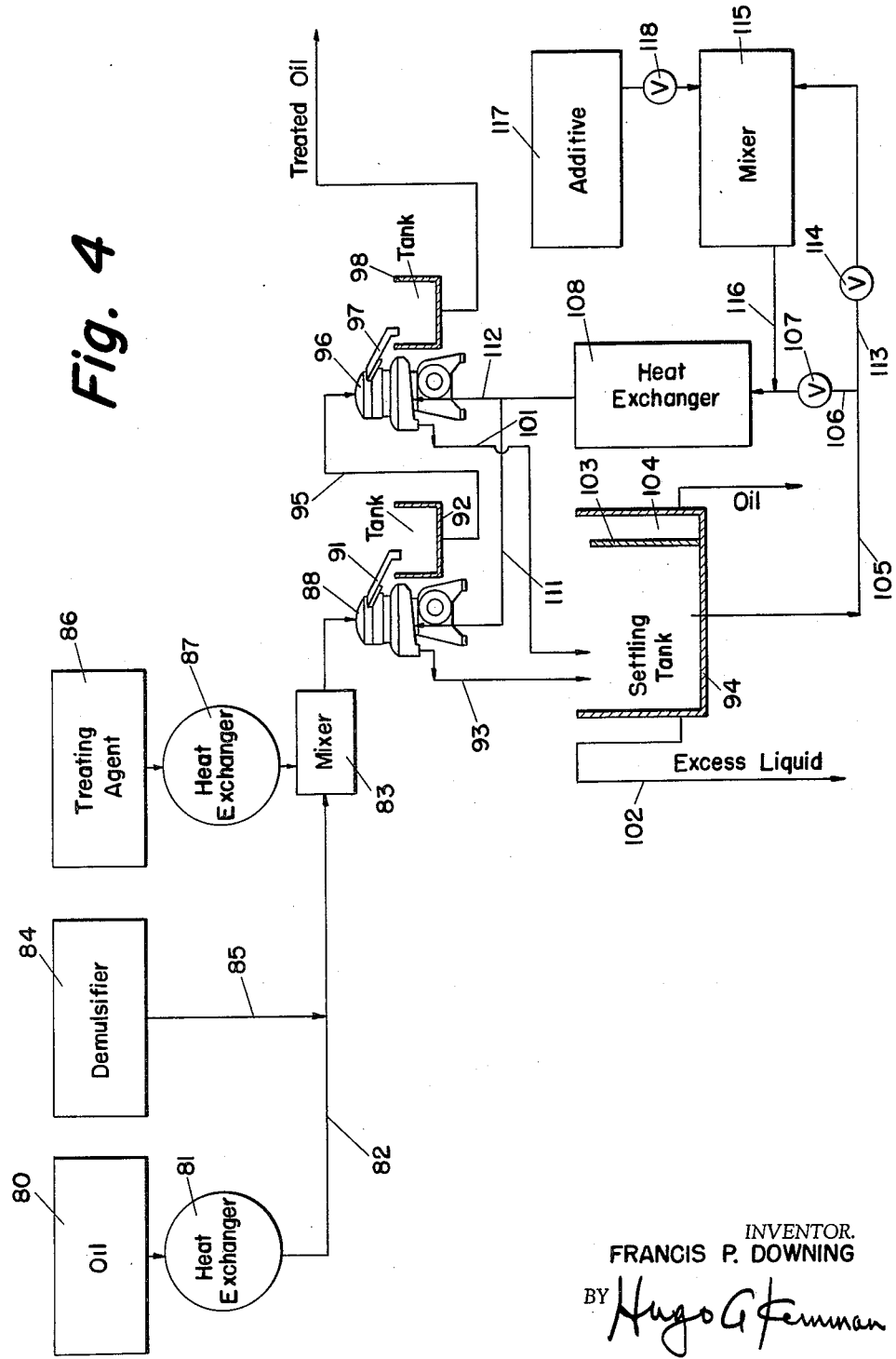
FIGURE 4 is a flow sheet.

Referring now to FIGURE 4, at 80 is shown a source of oil, the temperature of which is controlled as it flows through heat exchanger 81. The oil then flows through line 82 to mixer 83. A demulsifier or emulsions breaker, for example the material known in the trade as Tretolite, from source 84, preferably is added to the oil through line 85 as the oil flows through line 82. Treating agent, e.g. water, is added to the oil in mixer 83 from a source 86, the temperature of the treating agent being controlled as it flows through heat exchanger 87. The mixture of oil, demulsifier and water flows from mixer 83 to centrifuge 88 which has a bowl of the type illustrated in FIGURES 1 to 3. The separated oil leaves centrifuge 88 through spout 91 and is collected in tank 92. The peripheral discharge from the centrifuge bowl leaves centrifuge 88 through line 93 and is collected in settling tank 94.

As illustrated, the oil collected in tank 92 is again centrifuged for the purpose of removing residual treating agent. For this purpose, oil leaves tank 92 through line 95, and is fed into centrifuge 96 which has a bowl of the same type as centrifuge 88. The oil separated in centrifuge 96 flows through spout 97 into tank 98 from which it is conducted to any suitable point, not shown. The peripheral discharge from the bowl of centrifuge 96 flows through line 101 into settling tank 94.

In settling tank 94 any solids, such as sludge, settle to the bottom, and any oil that might have been carried away with the treating agent floats to the top, the level of liquid in tank 94 being controlled, such as by a leg illustrated at 102.

Tank 94 is provided with an overflow baffle 103 leading into a chamber 104, the height of baffle 103 being such that any oil floating on the top of the treating agent in tank 94 may be skimmed off and collected in chamber 104, from which it is conducted to any suitable point, such as back to the original oil feed, e.g. source 80.

Treating agent collected in settling tank 94 preferably is employed as auxiliary liquid in the operation of centrifuges 88 and 96. As illustrated, treating agent from tank 94 flows through line 105, line 106, valve 107, heat exchanger 108, and lines 111 and 112 to the auxiliary liquid feed nozzles of centrifuges 88 and 96, respectively, any excess auxiliary liquid not accepted by the respective centrifuges spilling down and collected in any suitable manner, not shown.

Adjustment of the position of the "e" line in the bowls of the respective centrifuges 88 and 96 is effected by controlling the temperature of the auxiliary liquid, e.g. water, fed into said bowls, variation in density of the auxiliary liquid with change in temperature being adequate for the purpose, once appropriate upper and lower ring dams have been selected for said bowls, as above described. The temperature of the auxiliary liquid is controlled by means of heat exchanger 108.

A surprising fact is that, even though the difference in temperature between the oil and auxiliary liquid fed to a bowl may be relatively wide, e.g. of the order of 100° F. or 150° F., the temperature of the auxiliary liquid has very little effect upon the temperature of the oil. The reason for this has not been definitely established, but the result appears to be due to some extent at least to maintaining the auxiliary liquid in the bowl in the form of a layer that does not intermix to any large degree with the oil as the latter flows through the bowl. Moreover, since the oil flow is continuous, the opportunity for contact of any portion thereof with auxiliary liquid is quite short.

The temperature of the wash liquid separated from the oil in a centrifuge is, of course, of the same temperature as the oil, and since the separated wash liquid is soluble in the auxiliary liquid, the temperature of the latter is changed within the bowl due to such intermixture. In practice, this is not a shortcoming, first because it is customary to add wash liquid in mixer 83 in uniform proportion to the oil, which results in a uniform change in temperature of the auxiliary liquid in the bowl, and second because auxiliary liquid is preferably employed in much larger proportion than wash liquid, e.g. from 5 to 15 parts of auxiliary liquid to one part of wash liquid, which substantially reduces the effect of difference in temperature. Feeding auxiliary liquid at a relatively high rate to a bowl also makes possible the use of larger discharge nozzles with resulting reduced chance of clogging. In other sources of oil and water mixtures, the ratio of water to oil is usually more or less constant in the sense that variations are not rapid and can be compensated for by adjustment of density of the auxiliary liquid during operation.

Whereas during the centrifuging operation, a decrease in density of the oil, or an increase in density of the auxiliary liquid, causes the "e" line to move radially inwardly, an increase in density of the oil, or a decrease in density of the auxiliary liquid, causes the "e" line to move radially outwardly. Thus to offset the effect on the "e" line of a decrease in density of the oil during centrifuging, the density of the auxiliary liquid is likewise decreased, e.g. by raising its temperature. And since an increase in the density of the oil causes the "e" line to move radially outwardly, this effect may be offset by increasing the density of the auxiliary liquid, e.g. by reducing its temperature.

The approximate, including the optimum, position of the "e" line can be readily determined by persons skilled in the operation of centrifuges, by merely employing as the criteria the results obtained. Bringing the "e" line radially inwardly too far within the area of the discs, results in a marked reduction in efficiency of clarification of the oil, whereas bringing the "e" line too far radially outwardly so as to overlap the outlets of tubes 47 results in loss of seal. Between the two extremes, the position of the "e" line is controlled by the operator so as to obtain the desired results. Should either extreme be encountered, the situation may be corrected by an appropriate change in density of the auxiliary liquid, as will be clearly understood.

As pointed out above, the density of the auxiliary liquid may be varied by means other than, or in combination with, change in temperature.

The control of the density of the auxiliary liquid by the use of an additive also is illustrated in FIGURE 4, wherein by closing valve 107, the auxiliary liquid is made to flow through line 113, valve 114, mixer 115 and line 116 back to line 106, and then through heat exchanger 108. Additive, in regulated amount, is added to the auxiliary liquid from a source 117, the ratio being controlled by any suitable means, of which valve 118 is illustrative. Since excess auxiliary liquid is continuously removed at 102, the quantity being continuously replaced by separated treating agent, the flow of additive from source 117 into mixer 115 is continuous, and in desired ratio, to arrive at the desired density for the auxiliary liquid. While normally valve 107 will be closed when valve 114 is open, so as to cause all of the auxiliary liquid to pass through mixer 115 for efficient mixing purposes, the flow can be divided between valve 107 and 114, if desired for any reason. The temperature of the resulting solution is illustrated as being controlled in heat exchanger 108.

Thus the density of the auxiliary liquid may be controlled by control of its temperature, the ratio of additive being held constant, or by control of the ratio of additive, the temperature being held constant, or by both, thus affording a very wide range of density control.

When the purpose of processing the oil is separation or clarification only without washing, elements 83 to 87 may be omitted, or when using the same equipment, elements 84 to 87 may be inactuated. In the latter case, it is also possible to provide a by-pass around mixer 83 if desired.

Also, while the use of two centrifuges in series has been shown and described, the centrifuges may be used in parallel, if desired, or one centrifuge may be eliminated, or additional centrifuges may be employed in series, and/or parallel, depending upon the results desired, as will be understood by persons skilled in the art.

It will be recognized by persons skilled in the art that, since the mechanisms of separation employed are physical in character, the invention is applicable to the purification of any liquid irrespective of its nature, source or composition, oil being an example, and irrespective of the material or the amount thereof, to be separated therefrom, and that likewise, the auxiliary liquid may be of any nature, source or composition, provided that it is insoluble, or relatively insoluble in the first-mentioned liquid, and is relatively inert chemically, or at least preferably so, with respect to same under the conditions of separation. Moreover, the material, which term includes mixtures thereof, to be separated in the purification treatment of a liquid, may be liquid or solid or a combination of the two, provided that said material is either soluble in the auxiliary liquid, or if and to the extent insoluble, of equal or greater density than the auxiliary liquid, so as to cause insolubles to be separated to accumulate at the inner periphery of the bowl, and thus be discharged from the centrifuge bowl together with auxiliary liquid. The latter applies more particularly to solids, but is equally applicable to any liquids that are insoluble in the auxiliary liquid as will be clearly understood.

For convenience in the claims, the term "capable of sedimenting into said second-mentioned liquid" is intended to cover the condition of solubility in said liquid whether of higher or lower density, and of insolubility whether of equal or of higher density than said liquid.

Having particularly described my invention, it to be understood that this is by way of illustration, and that changes, omissions, additions, substitutions and/or other modifications may be made without departing from the spirit thereof. Accordingly, it is intended that the patent shall cover, by suitable expression in the claims, the various features of patentable novelty that reside in the invention.

I claim:

1. In a centrifuge, the combination of a rotatable centrifuge bowl having a separating chamber, means for feeding a mixture to be separated into said separating chamber, said bowl having a plurality of circumferentially spaced radially positioned peripheral outlets, a ring dam at the top of said bowl for the discharge of a liquid effluent from said bowl, a ring dam at the bottom of said bowl, a plurality of circumferentially spaced channels leading from said second-mentioned ring dam to the outer region of said separating chamber, said second-mentioned ring dam having an inner radius larger than that of said first-mentioned ring dam, means for feeding a liquid influent to said bowl over said second-mentioned ring dam from a locus terminating short of overlapping radially the inner edge of said second-mentioned ring dam, and means for controlling the density of said last-mentioned liquid influent.

2. The combination of claim 1 wherein the bowl has a stack of frusto-conical discs in the separating chamber, and a central feed channel for feeding the mixture into the separating chamber, said feed channel leading to the outer periphery of the stack of discs adjacent the lowermost of said discs.

3. A process for the separation from a liquid of a component heavier than the liquid and in mixture and at least partly in emulsion therewith, including the steps of feeding the mixture into a centrifuging zone, forming at a position adjacent the periphery of the zone an interface between a layer of the liquid and an outer layer of an auxiliary liquid heavier than the first liquid, the component mixing into a homogeneous phase with the auxiliary liquid, withdrawing the separated liquid from a locus adjacent the axis of the zone to maintain the inward level of the liquid at the locus, withdrawing the auxiliary liquid and component outward from the periphery to the outside of the zone, continuously maintaining additional auxiliary liquid in a space adjacent the zone to a fixed level outward of the first locus, feeding the auxiliary liquid from the space in a path segregated from the first liquid and outward into the outer layer in the zone, and controlling the density of the auxiliary liquid to maintain the interface in its said position whereat high centrifugal force is available to break remaining emulsion tending to accumulate at the interface.

4. The process of claim 3 wherein the density of the auxiliary liquid is controlled at least in part by controlling its temperature.

5. The process of claim 3 wherein the mixture includes solid particles having a density greater than that of the liquid, the solid particles being withdrawn outward from the periphery to the outside of the zone.

6. A process for the separation from a liquid of a component mixed with said liquid but not dissolved therein, said component being of greater density than said liquid, including the steps of introducing the mixture to a centrifuging zone at a locus outside of thin stacked frusto-conical clarifying spaces, forming in said zone an interface between an inner layer of said first liquid and an outer layer of an auxiliary liquid immiscible with and of greater density than said first liquid and miscible with the component, leading the first liquid inward through the thin stacked frusto-conical clarifying spaces and discharging it at a fixed locus inwardly of the periphery of said centrifuging zone, leading off said auxiliary liquid with the separated component outwardly from the centrifuging zone through openings to the outside of the zone, feeding additional auxiliary liquid into the centrifuging zone outwardly into the said outer layer, establishing and maintaining an inward hydrostatic column segregated from the liquid inward of the interface but communicating with the outer layer and extending inward therefrom to a fixed radial vent position, the column being of liquid of density greater than that of the inner layer, the vent position being outward from the outlet for said first liquid, venting off excess from the column at the vent position to the outside of the zone, and controlling and maintaining said auxiliary liquid at a density which results in the desired positioning of the interface in the zone outward from the clarifying spaces.

7. The process of claim 6 wherein the auxiliary liquid is fed into the zone through said inward hydrostatic column and the liquid in the column comprises the auxiliary liquid.

8. The process of claim 6 wherein the density of the auxiliary liquid is controlled at least in part by controlling its temperature.

References Cited in the file of this patent

UNITED STATES PATENTS

| | | |
|---|---|---|
| 1,158,959 | Beach | Nov. 2, 1915 |
| 1,373,743 | Jones | Apr. 5, 1921 |
| 2,138,468 | Ayres | Nov. 29, 1938 |
| 2,179,941 | Lindgren | Nov. 14, 1939 |
| 2,302,382 | Scott | Nov. 17, 1942 |
| 2,534,210 | Schutte et al. | Dec. 12, 1950 |
| 2,625,321 | Glasson | Jan. 13, 1953 |
| 2,628,021 | Staaff | Feb. 10, 1953 |
| 2,807,411 | Ayres | Sept. 24, 1957 |
| 2,905,643 | Billue et al. | Sept. 22, 1959 |

OTHER REFERENCES

George Brown: "Unit Operations," John Wiley & Sons Inc., New York, pages 298, 299, TP–157–B7.